United States Patent
Bifulco

(10) Patent No.: US 10,218,617 B2
(45) Date of Patent: Feb. 26, 2019

(54) METHOD AND NETWORK DEVICE FOR HANDLING PACKETS IN A NETWORK BY MEANS OF FORWARDING TABLES

(71) Applicant: NEC Europe Ltd., Heidelberg (DE)

(72) Inventor: Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 80 days.

(21) Appl. No.: 15/318,363

(22) PCT Filed: Jul. 15, 2015

(86) PCT No.: PCT/EP2015/066187
§ 371 (c)(1),
(2) Date: Dec. 13, 2016

(87) PCT Pub. No.: WO2016/008934
PCT Pub. Date: Jan. 21, 2016

(65) Prior Publication Data
US 2017/0134277 A1 May 11, 2017

(30) Foreign Application Priority Data
Jul. 15, 2014 (EP) .................................... 14177027

(51) Int. Cl.
| | |
|---|---|
| *H04L 12/28* | (2006.01) |
| *H04L 12/741* | (2013.01) |
| *H04L 12/931* | (2013.01) |
| *H04L 12/935* | (2013.01) |
| *H04L 12/721* | (2013.01) |

(52) U.S. Cl.
CPC ............ *H04L 45/745* (2013.01); *H04L 45/38* (2013.01); *H04L 49/3009* (2013.01); *H04L 49/70* (2013.01)

(58) Field of Classification Search
CPC .............................. H04L 45/745; H04L 45/38
See application file for complete search history.

(56) References Cited

U.S. PATENT DOCUMENTS 5,987,557 A * 11/1999 Ebrahim ............. G06F 12/1483
710/200
6,157,644 A * 12/2000 Bernstein ................ H04L 45/00
370/389

(Continued)

OTHER PUBLICATIONS

Muhammad Bilal Anwer et al: "Switchblade", Computer Communication Review, ACM, New York, NY, US, vol. 41, No. 4, Aug. 30, 2010 (Aug. 30, 2010), pp. 183-194, XP058004883.

(Continued)

*Primary Examiner* — Farah Faroul
(74) *Attorney, Agent, or Firm* — Leydig, Voit & Mayer, Ltd.

(57) ABSTRACT

A method for handling packets in a network by means of forwarding tables includes providing a software switching layer for implementing a software forwarding table; providing a hardware switching layer for implementing at least one of exact matching forwarding tables and wildcard matching forwarding tables; and redistributing, by using a switch management component for controlling the software switching layer and the hardware switching layer, installed forwarding table entries (FTEs) matching a particular flow between the software switching layer and the hardware switching layer based on traffic characteristics of said flow.

15 Claims, 5 Drawing Sheets

(56) References Cited

U.S. PATENT DOCUMENTS

| | | | | |
|---|---|---|---|---|
| 6,870,840 B1* | 3/2005 | Hill | ................ | H04L 12/4625 370/360 |
| 7,724,734 B1* | 5/2010 | Grosser | ................ | H04L 45/02 370/389 |
| 2002/0181463 A1* | 12/2002 | Knight | ................ | H04L 12/5601 370/392 |
| 2003/0093616 A1* | 5/2003 | Slavin | ................ | G06F 17/30982 711/108 |
| 2005/0125424 A1* | 6/2005 | Herriott | ................ | H04L 69/22 |
| 2006/0015648 A1* | 1/2006 | Lappin, Jr. | ................ | H04L 69/22 709/246 |
| 2006/0221850 A1* | 10/2006 | Buckley | ................ | H04L 47/2441 370/252 |
| 2008/0189769 A1* | 8/2008 | Casado | ................ | G06F 21/6281 726/4 |
| 2008/0212586 A1* | 9/2008 | Wang | ................ | H04L 45/00 370/392 |
| 2009/0138577 A1* | 5/2009 | Casado | ................ | H04L 41/06 709/220 |
| 2011/0270979 A1* | 11/2011 | Schlansker | ................ | H04L 12/4625 709/224 |
| 2013/0290945 A1* | 10/2013 | Sawal | ................ | G06F 8/67 717/168 |
| 2014/0226467 A1* | 8/2014 | Park | ................ | H04L 47/2491 370/229 |
| 2014/0241357 A1* | 8/2014 | Liu | ................ | H04L 45/745 370/392 |
| 2015/0016255 A1* | 1/2015 | Bisht | ................ | H04L 47/11 370/235 |
| 2015/0023347 A1* | 1/2015 | Kapur | ................ | H04L 12/18 370/390 |
| 2015/0249587 A1* | 9/2015 | Kozat | ................ | H04L 43/10 370/222 |
| 2015/0373688 A1* | 12/2015 | Samuel Raj | ................ | H04L 12/4641 370/329 |
| 2016/0182372 A1* | 6/2016 | Holbrook | ................ | H04L 45/748 370/392 |
| 2018/0026889 A1* | 1/2018 | Vobbilisetty | ................ | H04L 49/3009 |

OTHER PUBLICATIONS

Naous, J; Erickson, D; Adam Covington, G; Appenzeller, G; McKeown, N.: "Implementing an OpenFlow Switch on the NetFPGA platform", ACM, 2 Penn Plaza, Suite 701—New York USA, vol. ANCS '08, Nov. 6, 2008 (Nov. 6, 2008), pp. 1-8, XP04066645.

Danny Yuxing Huang et al: "High-fidelity switch models for software-defined network emulation", Hot Topics in Software Defined Networking ACM, 2 Penn Plaza, Suite 701 New York NY 10121-0701 USA, Aug. 16, 2013 (Aug. 16, 2013), pp. 43-48, XP058030686.

Naga Katta et al: "Infinite CacheFlow in software-defined networks", Hot Topics in Software Defined Networking, ACM, 2 Penn Plaza, Suite 701 New York NY 10121-0701 USA, Aug. 22, 2014 (Aug. 22, 2014), pp. 175-180, XP058053579.

\* cited by examiner

| L2_src | L2_dst | L2_pro | L3_src | L3_dst | L3_pro | L4_src | L4_dst |
|---|---|---|---|---|---|---|---|
| - | - | - | - | 1.1.1.1 | - | - | - |

| L2_src | L2_dst | L2_pro | L3_src | L3_dst | L3_pro | L4_src | L4_dst |
|---|---|---|---|---|---|---|---|
| AA:BB:CC:00:00:01 | AA:BB:CC:EE:EE:00 | IP | 192.168.0.1 | 1.1.1.1 | TCP | 12459 | 80 |

Aggregated counter

964

Sub-flow counters

840

4

120

Aggregated flow identified by a wildcard matching FTE

| L2_src | L2_dst | L2_pro | L3_src | L3_dst | L3_pro | L4_src | L4_dst |
|---|---|---|---|---|---|---|---|
| - | - | - | - | 1.1.1.1 | - | - | - |

Sub-flows identified by exact matching FTEs

| L2_src | L2_dst | L2_pro | L3_src | L3_dst | L3_pro | L4_src | L4_dst |
|---|---|---|---|---|---|---|---|
| AA:BB:CC:00:00:01 | AA:BB:CC:EE:FF:00 | IP | 192.168.0.1 | 1.1.1.1 | TCP | 12459 | 80 |

| L2_src | L2_dst | L2_pro | L3_src | L3_dst | L3_pro | L4_src | L4_dst |
|---|---|---|---|---|---|---|---|
| AA:BB:CC:00:00:01 | AA:BB:CC:EE:FF:00 | IP | 192.168.0.1 | 1.1.1.1 | TCP | 2090 | 22 |

| L2_src | L2_dst | L2_pro | L3_src | L3_dst | L3_pro | L4_src | L4_dst |
|---|---|---|---|---|---|---|---|
| AA:BB:CC:00:00:01 | AA:BB:CC:EE:FF:00 | IP | 192.168.0.2 | 1.1.1.1 | TCP | 4332 | 80 |

Fig. 6

METHOD AND NETWORK DEVICE FOR HANDLING PACKETS IN A NETWORK BY MEANS OF FORWARDING TABLES

CROSS REFERENCE TO RELATED APPLICATIONS

This application is a U.S. National Stage Application under 35 U.S.C. § 371 of International Application No. PCT/EP2015/066187 filed on Jul. 15, 2015, and claims benefit to European Patent Application Nos. EP 14177027.1 filed on Jul. 15, 2014. The International Application was published in English on Jan. 21, 2016 as WO 2016/008934 A1 under PCT Article 21(2).

FIELD

The present invention relates to a method for handling packets in a network by means of forwarding tables. Furthermore, the present invention relates to a network device implementing forwarding tables for handling packets in a network.

BACKGROUND

Traditionally, the performance of a switch has been measured by evaluating its packets forwarding throughput. With the success of Software-Defined Networking (SDN) and its growing number of deployments and applications, however, the requirements for switches are changing. Switches are required to still forward packets as fast as possible, but they also need to support the new dynamic and flexible control plane.

Early SDN deployments already highlighted forwarding table size and its update speed as two critical switches' performance metrics. As the research and industrial communities acquire more and more confidence with the new capabilities introduced with SDN, complex control programs that fully exploits devices' programmability are being increasingly proposed.

This finally adds forwarding table size and its update speed as important performance metrics for tomorrow's switches. Forwarding tables are required to host large numbers of entries, with flexible flow matching patterns, and which undergo frequent updates.

While Ternary Content Addressable Memories (TCAMs) become more and more critical to implement flexible packet matching in hardware, there is still no solution to make them bigger without reducing their speed. The few thousands forwarding entries supported by today's SDN switches are going to be further reduced to enable TCAMs at supporting faster networks. Furthermore, the TCAM entries updating procedures, which potentially require a re-organization of the memory, are proving to be too slow for the upcoming, dynamic network control plane applications.

Modern software switches do not suffer from these issues, since they can perform fast forwarding (wildcard matching) entries installation, but can forward only a few millions of packets per second.

SUMMARY

In an embodiment, the present invention provides a method for handling packets in a network by means of forwarding tables. The method includes providing a software switching layer for implementing a software forwarding table; providing a hardware switching layer for implementing at least one of exact matching forwarding tables and wildcard matching forwarding tables; and redistributing, by using a switch management component for controlling the software switching layer and the hardware switching layer, installed forwarding table entries (FTEs), a particular flow between the software switching layer and the hardware switching layer being matched based on traffic characteristics of said flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 is a diagram illustrating an operational mode of a switch that applies an aggregated flow packets counter and per-sub-flow packets counters in accordance with an embodiment of the present invention.

DETAILED DESCRIPTION

Figure 1:
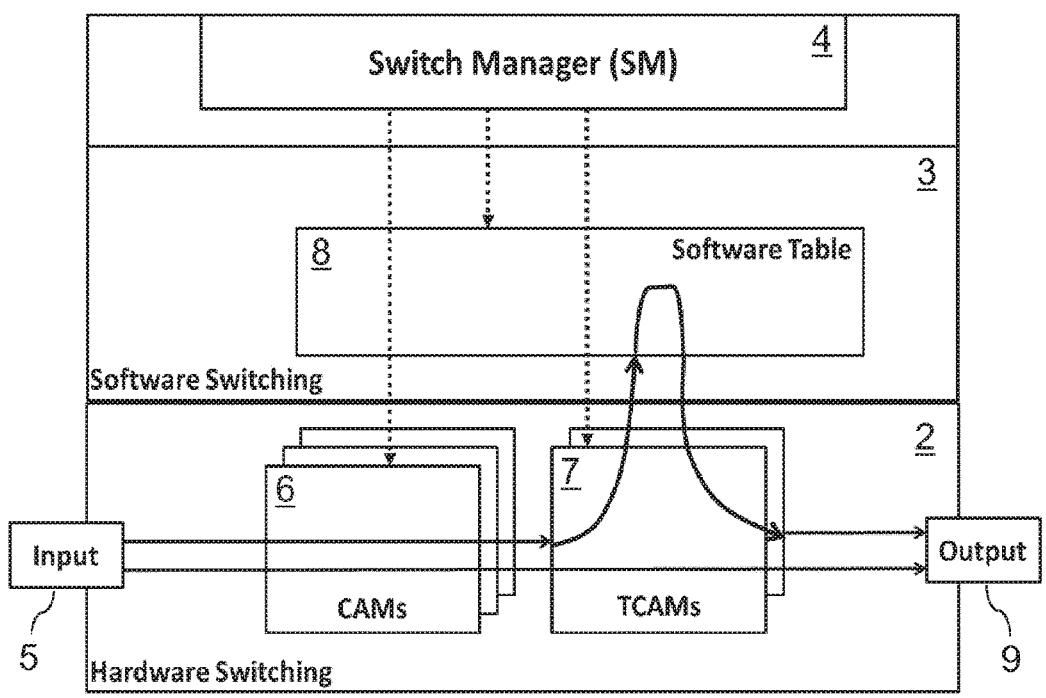
FIG. 1 is a schematic view illustrating a basic structural design of a switch in accordance with an embodiment of the present invention.

In an embodiment, the present invention provides an improved method and network device allowing for a reduction in expensive memory for performing hardware wildcard matching while still providing line rate forwarding performance.

In an embodiment of the invention, a method is provided for handling packets in a network by means of forwarding tables. The method includes providing a software switching layer for implementing at least one software forwarding table, providing a hardware switching layer for implementing at least one of exact matching forwarding tables and wildcard matching forwarding tables, using a switch management component for controlling said software switching layer and said hardware switching layer. Said switch management component redistributes installed forwarding table entries (FTEs) matching a particular flow between said software switching layer and said hardware switching layer based on traffic characteristics of said flow.

Furthermore, in an embodiment of the invention, a network device is provided for implementing forwarding tables for handling packets in a network. The network device includes a software switching layer, a hardware switching layer, and a switch management component for controlling said software switching layer and said hardware switching layer. Said switch management component is configured to redistribute installed forwarding table entries (FTEs) matching a particular flow between said software switching layer and said hardware switching layer based on traffic characteristics of said flow.

As described herein, expensive hardware wildcard matching memory can be reduced while still providing line rate forwarding performance by dynamically redistributing FTEs matching a particular flow between the software switching layer and the hardware switching layer based on characteristic of the flow, for instance by offloading traffic from software to hardware. In this regard, embodiments relate to the utilization of software wildcard matching emulation and exact matching forwarding tables (e.g., based on hash memories or CAMs) to reduce the entries in a wildcard matching forwarding table (e.g., based on TCAMs). Embodiments may actually speed-up the FTE installation speed, although for a short transitory period the corresponding flow may perceive a limited forwarding throughput.

In terms of the network device's structural design, a pipeline arrangement of forwarding tables may be provided. Specifically, the software switching layer could implement at least one software forwarding table that enables installation of wildcard matching FTEs, and the hardware switching layer could implement at least one of exact matching forwarding tables and wildcard matching forwarding tables. In such composition the forwarding tables could be implemented in such a way that a packet received at an input port of the network device is first processed by the exact matching forwarding tables, then by the wildcard matching forwarding tables, and finally by the software forwarding table.

It may be provided that the switch management component, in case a packet of a flow matches a wildcard FTE of the software forwarding table, analyzes traffic characteristics of this flow and moves the wildcard FTE to the hardware switching layer in case the traffic characteristics of said flow comply with predefined criteria. For instance, a move of the wildcard FTE may be executed in case of heavy flows, i.e. flows that exceed a predefined size.

The switch management component, upon a packet of a flow matching a wildcard FTE of the software forwarding table, may analyze the matching packet's header fields and, based on this analysis, derive an exact matching FTE. It may be provided that this exact matching FTE is moved to the hardware switching layer and is installed in one of the exact matching forwarding tables (i.e. this embodiment not only realizes a pure switch of FTEs from software to hardware, but also a particular transformation of the FTEs before they are actually moved). Thus, by doing so, wildcard matching entries implemented in the hardware switching layer can be replaced with a combination of software emulated wildcard matching and hardware exact matching entries, thereby reducing the usage of wildcard matching forwarding tables space (which ultimately reduces the switch's costs), while preserving the switch's forwarding performance. In this regard it is important to note that wildcard matching memories such as TCAMs have limited size and the bigger they are the slower they process packets. Future switches will therefore have smaller TCAMs. The proposed mechanism provides the same wildcard matching semantic of an expensive TCAM-based forwarding table, while using a different hardware implementation (e.g., CAM) and providing line rate forwarding performance.

The switch management component may be configured to monitor the number of packets of a flow received by the software forwarding table that are matching a wildcard FTE, which may be used to support efficient and precise trading of the software switching layer workload with exact matching memory. Specifically, it may be provided that, for each new packet received by said software forwarding table that matches the wildcard FTE and that has no exact matching FTE already in the software forwarding table, the switch management component generates an exact matching FTE, which is then installed in the software forwarding table. The switch management component may run a packet counter for each exact matching FTEs (identifying a sub-flow of packets) that counts the packets that match the respective exact matching FTEs. Based on these statistics decisions may be taken by the switch management component of whether to move an exact matching FTE to the hardware switching layer and install it in one of the exact matching forwarding tables, or not. For instance, such move may be executed only in case the respective packet counter exceeds a predefined contribution threshold.

The network device may be implemented as a distributed network device, wherein the hardware switching layer may be implemented in a hardware OpenFlow switch, and wherein the software switching layer may be implemented in a software OpenFlow switch being connected to the hardware OpenFlow switch. In this arrangement, the switch management component may be implemented as a proxy element that is configured to exchange OpenFlow messages both with the hardware and the software OpenFlow switches and with an OpenFlow Controller. To ensure proper forwarding of packets between the hardware and the software OpenFlow switches, packet tagging and un-tagging operations may be applied to match packets on the correct input port of the hardware OpenFlow switch and/or to forward packets to the correct hardware switch destination port in the software OpenFlow switch.

Before turning to the description embodiments of the present invention, the concepts of hardware switching on the one hand and of software switching on the other hand will be explained hereinafter in some detail.

Generally, to provide high packet processing speed, hardware switches implement quite complex architectures. A packet delivered at a switch's port is handled by a line card that takes care of the network physical layer, then, the packet is passed to a pipeline of forwarding tables. Here, the packet header is used as key to find (lookup) the action to be applied to the packet. The pipeline can contain several steps. A typical architecture may include: (i) a table performing packet classification based on the input port and/or VLAN tags; (ii) a forwarding table performing exact matching on L2 network header, i.e., MAC addresses and VLAN tags; (iii) a L3 table performing exact matching on IP addresses; and finally, (iv) an ACL table implementing wildcard matching with a flexible flow definition based on arbitrary packet header fields. The pipeline may be even more complicated, for instance, it may allow packets to be re-injected at an intermediary pipeline's stage, it may include additional stages, it may perform packet modifications along the pipeline, etc.

Usually, each stage attaches some meta-data to the packet that can be used to perform the matching at next stages. The ACL table, implementing a flexible wildcard matching, e.g., used to match a header field against a range of values, is the most used for supporting advanced switches' capabilities, such as OpenFlow operations.

After the pipeline, the packet is delivered to an output processing module. Here, additional actions are applied to the packets, such as rewriting some packet header fields. Finally, the packet is delivered to the designed output port, where eventually it is queued and scheduled for transmission.

One of the main issues is to provide high packet forwarding throughput while performing flexible packets matching, that is, to perform fast lookup operations. The packet matching problem is actually split in two problems: exact matching and wildcard matching. The former is usually solved using Content Addressable Memories (CAM). These memories are able to perform a parallel search over a big number of entries to find the matching one with the provided key. For instance, the L2 forwarding table is usually implemented with a CAM that can easily host a hundred of thousands entries. Wildcard matching implementation is much more difficult and currently relies on Ternary Content Addressable Memories (TCAM). In fact, TCAM allows to specify "don't care" values for an entry, which combined with a proper entries ordering can provide the prioritized wildcard matching required, for instance, by OpenFlow switches or by the longest prefix matching algorithm used in IP routers.

Even assuming that the costs of a switch do not play any role (which is, in the best case, unlikely), current hardware technology cannot help in satisfying the aforementioned requirements. Although TCAMs are the de-facto standard to perform flexible packets lookup at line rate, their speed and efficiency decreases as their capacity increases. Future switches implementing ports of 40 Gbit/s and 100 Gbit/s will be forced to provide less TCAM space to perform lookups fast enough. Alternative designs, such as hierarchical composition of several smaller TCAMs, cannot completely solve this issue as well, since each level of the hierarchy would introduce additional delay. To make the things even worse, the implementation of flexible packet matching may require the writing of more than one entry in the TCAM, in a precise order. This can make the update operation very slow, since several write accesses are required and entries may need to be shuffled around in the memory.

On the other hand, a software switch runs on hardware that is usually composed of a CPU with its caches hierarchy implemented with SRAMs, a slower central memory based on DRAMs and a high-speed system bus that connects the CPU with the central memory and the Network Interface Cards (NICs). Applying proper optimizations makes software switches able to forward several millions of packets per second, serving at line rate a few 10 Gbit/s NICs.

Although this performance is still far from hardware forwarding speed by one or two orders of magnitude, software switches come with some advantages. Software forwarding tables are not limited in size and can be updated at very high rates. Furthermore, a software switch is easy to modify to introduce new logic and can implement almost any kind of operation on the packets.

Embodiments of the present invention therefore relate to a mechanism to implement wildcard matching in an optimized manner, which reduces the usage of TCAM space, while preserving the switch's forwarding performance, by replacing possible TCAM entries with a combination of software emulated wildcard matching and CAM-based exact matching entries. It is once again noted that the term "CAM" as employed herein is meant to include any memory which is able to perform exact matching operations, for instance, a hash table can be considered as a type of CAM in the context of embodiments of the present invention.

FIG. 1 is a schematic view illustrating the basic structural design of a switch 1 in accordance with embodiments of the present invention. According to these embodiments the switch 1 comprises a hardware switching layer 2, a software switching layer 3 and a switch management component or switch manager, SM, 4 for controlling the hardware switching layer 2 and the software switching layer 4.

Packets received at an input port 5 at the hardware switching layer 2 are processed in a pipeline manner. This switch pipeline consists of exact matching forwarding tables, EM-FTEs, 6 (hereinafter sometimes also referred to as CAMs, Content Addressable Memory, however, without limiting the implementation to this specific technology) and of wildcard matching forwarding tables, WM-FTEs, 7 (hereinafter sometimes also referred to as TCAMs, Ternary Content Addressable Memory, however, again without limiting the implementation to this specific technology), both kinds of FTEs being implemented at the hardware switching layer 2. Furthermore, the pipeline comprises a high-performance software forwarding table 8 implemented at the software switching layer 3.

After having passed the switch pipeline, the packets are forwarded via an output port 9. It should be noted that real switches comprise both a number of different input ports and a number of different output ports. However, for the sake of enhanced illustrative clarity, in FIG. 1 these different input/output ports are illustrated as single input port 5 and as single output port 9.

According to embodiments of the invention the switch manager 4 implements smart algorithms to redistribute FTEs and to move FTEs to those forwarding tables that best match the corresponding flow characteristics. On a very high-level SM 4 may operate as follows:

Any new FTEs are first installed in the software switching layer 3. This comes along with the advantage of providing a fast entries installation rate. As soon as a FTE is installed in the software forwarding table 8, the matched packets are forwarded. Eventually, SM 4 redistributes the entries between the software switching layer 3 and the hardware switching layer 2. According to an embodiment the movement of entries between different forwarding tables 6, 7, 8 may happen in dependence of the traffic characteristics. For instance, heavy flows tend to be moved into the hardware switching layer 2, while light flows would typically stay in the software table 8.

Performing wildcard matching in hardware requires the use of TCAMs, which is an expensive and scarce resource, as already mentioned above. In order to enlarge the capacity of the switch 1 of hosting wildcard matching forwarding table entries (FTEs) or, to an extreme, to completely remove TCAMs, embodiment of the invention relate to strategies that go beyond the simple installation of entries in the software switching layer 3. In fact, these embodiments provide a wildcard emulation mechanism that combines the software table 8 with the CAM-based tables 6, as will be described in detail hereinafter.

The mechanism may be implemented as follows: A wildcard matching FTE is installed in the software table 8. When a packet matches the entry, it is forwarded to the designated destination/output port 9. At the same time, the header's fields of the packet are used to collect statistics about the sub-flow identified by such header. Depending on the statistics (that is, on the traffic properties), an exact matching entry for a given sub-flow can be generated and installed in one of the CAM-based forwarding tables 6. This way, a subset of the flows matched by the wildcard matching FTE, e.g., the ones generating higher packets rates, is actually handled in the hardware switching layer 2, trading the software switching layer 3 workload with some CAM memory.

Figures 2, 3:
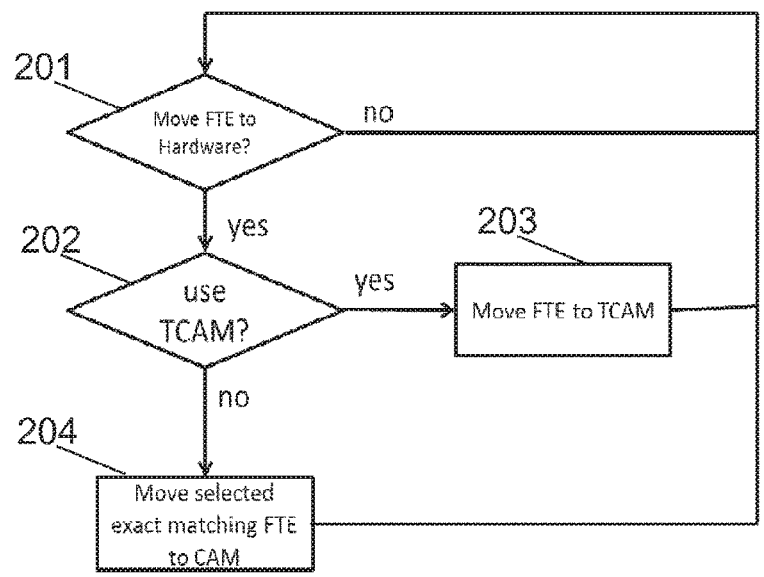
FIG. 2 is a diagram illustrating a high level FTEs moving scheme employed by a switch manager in accordance with an embodiment of the present invention.
FIG. 3 is a schematic view illustrating an example of matching fields for an FTE.

According to embodiments of the invention the SM 4, in order to decide how to move wildcard entries from the software table 8 to the hardware switching layer 2, may implement the following logic, which is illustrated on a high level in FIG. 2. As shown in step 201, the logic first decides if a FTE has to be moved to the hardware switching layer 2 in order to ensure proper performance of the software switching layer 3. For instance, this decision may be taken according to the size of the flow matched by the wildcard entry. Then, shown at step 202, the SM 4 decides whether to use a TCAM based forwarding table 7, i.e. a wildcard matching FTE, or a CAM based forwarding table 6, .e. an exact matching FTE. This decision may be taken according to: (i) the suitability of a wildcard entry to be implemented also in the CAM memories 6, and/or (ii) the properties of the flow matched by the wildcard entry. If the entry has to be moved to a TCAM based forwarding table 7 (shown at 203), the corresponding memory operations are issued and the algorithm concludes its cycle, starting again from the beginning (examining others FTEs).

On the other hand, if a CAM-based forwarding table is selected instead, the SM 4 performs a selection of which exact matching FTEs should be actually installed in the CAM (shown at 204). This decision can be taken according to different optimization logics, such as reducing the processing load on the software table 8, minimizing the CAM memory utilization, maximizing the forwarding throughput, etc.

Figures 4, 5:
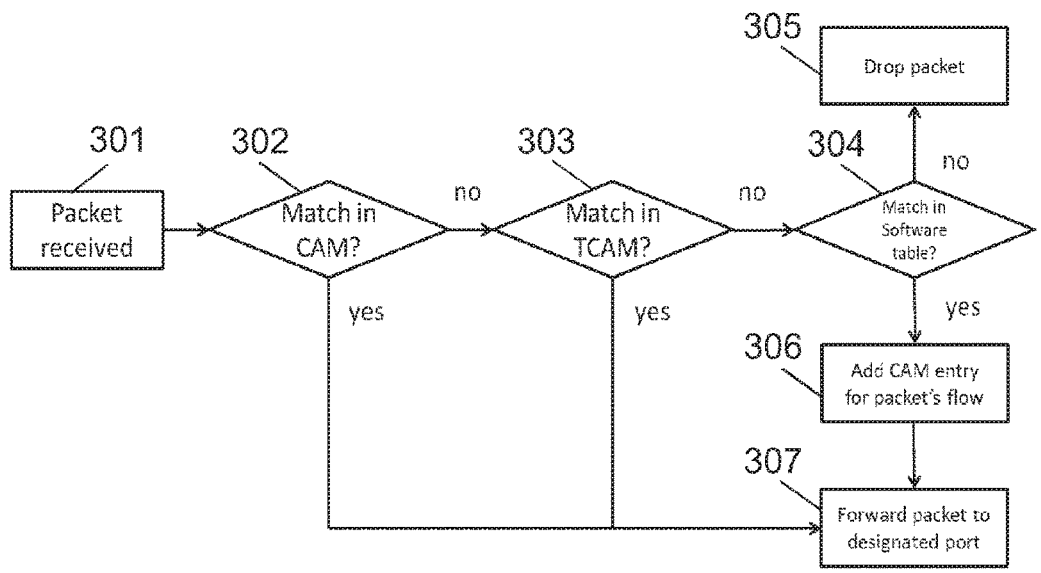
FIG. 4 is a diagram illustrating a packet processing flow chart in accordance with an embodiment of the present invention.
FIG. 5 is a schematic view illustrating an example of an exact matching FTE generated after packet reception and analysis in accordance with an embodiment of the present invention.

FIGS. 3-5 relates to an embodiment of the present invention that applies to an OpenFlow switch that receives flow_mod messages, containing instructions to install a new FTE, from an external OpenFlow controller. Basically, the structural design of the OpenFlow switch may be similar or even identical to the configuration of the switch shown in FIG. 2. Therefore, in the following description like reference numerals are employed for denoting like components as in FIG. 2.

The SM 4 can either implement by itself the OpenFlow agent that speaks with the OpenFlow controller or it can receive instructions from the OpenFlow agent to install a given FTE.

Here it is assumed that the flow_mod message contains a FTE with the matching fields of FIG. 3 and that the SM 4 installs this entry in the software table 8. The upper line in the FTE illustration of FIG. 3 indicates the different fields of a packet's header, while the bottom line indicates specified content of the respective header fields, e.g. in form of MAC- or IP addresses. Consequently, any packet that contains IP-address '1.1.1.1' in header field 'L3_dst' (while all other header fields may contain any arbitrary content) matches the FTE shown in FIG. 3.

As shown in the flow chart of FIG. 4, a packet is received by the switch (illustrated at 301) and is then processed as follows: In steps 302-304 the packet traverses the pipeline of memory used to implement the forwarding tables, as described above in connection with FIG. 1. Since the FTE is installed in the software table 8, only here the packet can find a corresponding matching (shown at 304). If the packet does not match the FTE, the packets will be dropped (shown at 305). On the other hand, upon matching the packet in the software table 8, the SM 4 is informed of the packet header's fields, which in turn are used by the SM 4 to derive an exact matching FTE that can be installed in the CAM-based forwarding tables 6. Then, the SM 4 installs the exact matching FTE in one of the CAM-based forwarding tables 6 (shown at 306) and the packet is forwarded towards its destination port 9 (shown at 307). An example of the exact matching FTE that can be generated thanks to the packet reception and packet header fields' analysis is shown in FIG. 5.

Another embodiment of the present invention, which is basically an extension of the previous embodiment, relates to a switch, in particular an OpenFlow switch with complex exact matching installation logic. Again, the switching design follows the switch design of FIG. 1. According to this embodiment, the SM 4 monitors the number of packets received by the software table 8 that are matching a wildcard matching FTE (WM-FTE). For such WM-FTE, the SM 4 generates an exact matching FTE (EM-FTE) for each new packet received that has no EM-FTE already in the software forwarding table 8. The EM-FTE is then installed in the software forwarding table 8. This way, the SM 4 can keep track of the contribution of each sub-flow (identified by the corresponding EM-FTE) to the total count of packets processed because of the WM-FTE presence.

An example of this process is shown in FIG. 6. In this example the aggregated flow counter has counted a total of 964 packets that matched the WM-FTE installed in the software table 8 at the software switching layer 3. Moreover, in this example three EM-FTEs have been generated (based on packet reception and packet header fields' analysis) and sub-flow counters have been implemented for each of these EM-FTEs. At the illustrated point in time, 840 packets have matched the first EM-FTE, 4 packets have matched the second EM-FTE, and 120 packets have matched the third EM-FTE.

Based on the value of these sub-flow counters, the SM 4 can decide to move to the CAM-based forwarding table 6 only the exact matching entries which are contributing the most to the total of the WM-FTE counter (i.e. the first EM-FTE in the above example). This enables the SM 4 to save on the CAM available space, moving to the CAM memory 6 only those entries that are overloading the software switching layer 3. Based on the actual load of the software switching layer 3, the decision of which of the derived EM-FTE are actually to be transferred to the hardware switching layer 2 can be dynamically adapted.

As will be easily appreciated by those skilled in the art, in the above embodiment, the term 'counters' is not used in a limiting sense, but is meant to include any statistics that can be maintained about a given FTE and that can be used to derive FTE movement decisions.

Upon making reference once again to FIG. 1, according to an embodiment the invention may be implemented to include the following steps:
1. A wildcard matching forwarding entry (WM-FTE) is installed in the switch 1.
2. The switch 1 installs the WM-FTE into its software forwarding table 8.
3. Any packet belonging to a flow matched by the WM-FTE is forwarded by the WM-FTE in the software table 8.
4. As such flow shows given traffic properties, such as, e.g., high throughput, a decision algorithm is run, to select the best forwarding table that can host the wildcard entry.
5. A selection mechanism either selects a TCAM table 7 to install the wildcard entry or a CAM based table 6.
6. In the latter case, a subset of the original traffic flow is identified by exact matching forwarding entries, which are installed to the CAM based forwarding tables 6.

7. The subset of the original flow is then forwarded in hardware, exploiting the CAM 6, while the remaining part is still forwarded by the software table 8.

Figure 7:
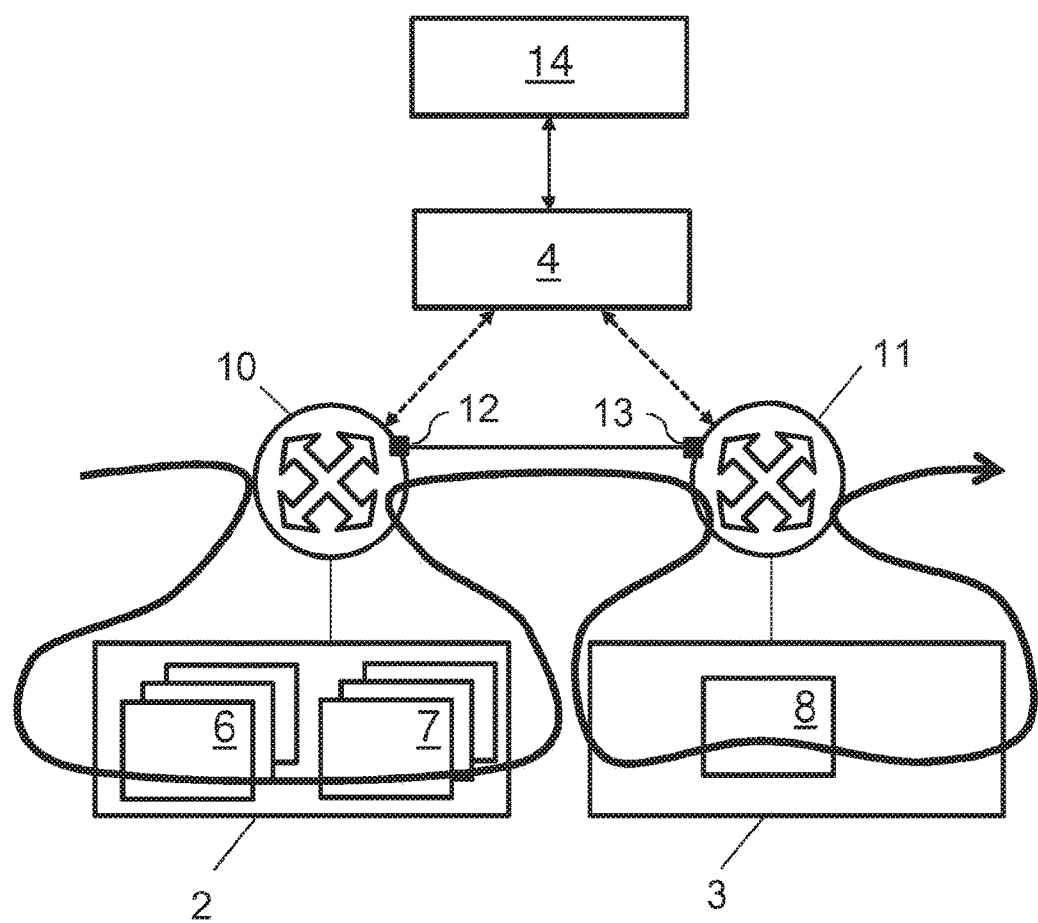
FIG. 7 is a schematic view illustrating of a distributed network device comprising a software OpenFlow switch and a hardware OpenFlow switch in accordance with an embodiment of the invention.

FIG. 7 illustrates an embodiment of the present invention that relates to a solution where the network device is realized in form of a distributed switch, in particular a distributed OpenFlow switch, which is implemented by combining a hardware OpenFlow switch 10 and a software OpenFlow switch 11. However, as will be easily appreciated by those skilled in the art, the embodiment is not restricted to the OpenFlow protocol, but can be applied in connection with any other existing or future SDN protocol that supports the deployment of hardware- and software-implemented FTEs.

The hardware OpenFlow switch 10 is configured with a number of static FTEs with minimum priority, one per physical input port, to ensure that a packet received on any of these input ports (not shown) is forwarded to a default output port 12 where the software switch is attached. Before being forwarded to the software switch 11, the packet is tagged with the originating hardware switch's 10 port number. Similarly, the software switch 11 can send packets tagged with the desired output port 13 to the hardware switch 10, which in turn will remove the tag and forward them to the designated port. Thus, in this embodiment the hardware switching layer 2 is implemented using the hardware OpenFlow switch 10 and the software switching layer 3 is implemented using the software OpenFlow switch 11.

The SM 4 is implemented as a proxy element that exchanges OpenFlow messages (indicated by the dotted lines) with the hardware and software switches 10, 11, playing the role of an OpenFlow Controller. Also, the SM 4 uses the OpenFlow protocol to speak with the OpenFlow Controller 14 (indicated by the solid line). In this latter case, the SM 4 plays the role of an OpenFlow switch.

From the OpenFlow Controller 14 perspective only the hardware OpenFlow switch 10 exists, while the software OpenFlow switch's 11 presence is masked by the SM 4, which actuates proper actions to redirect flow_mod messages and to introduce tag and un-tag operations in the packets, in order to handle the redirection between hardware switch 10 and software switch 11.

When the OpenFlow Controller 14 sends a flow_mod containing a WM-FTE to the SM 4, the SM 4 installs the FTE in the software forwarding table 8 of the software switch 11. The FTE has to be adapted to perform the following operations:
  a. Introducing the tagging and un-tagging operations to match on the correct hardware switch 10 receiving port and to send to the correct hardware switch 10 destination port in the software switch 11. In fact, all the packets are received by the software switch 11 from the same port 13 (i.e. the one connected to the hardware switch 10). The tags added by the hardware switch 10 actually enable the software switch 11 to discover the original receiving port. Likewise, the software switch 11 always forwards packets to one port 13 (i.e. the one connected to the hardware switch). The tags added by the software switch 11 enable the hardware switch 10 to finally forward the packet to the correct destination port.
  b. To the forward action of the FTE a new action is added, which can be described as "send the packet to controller". Since the software switch's 11 controller is actually the SM 4, this enables the SM 4 to learn the sub-flows to which that packet belongs and to install a corresponding EM-FTE to the software switch 11 (with higher priority than the WM-FTE).

The combination of the operations described so far enables the SM to read the sub-flows contribution by asking the counter status (as described in detail in connection with the embodiment of FIG. 6, which applies likewise for the present embodiment) of the software switch 11. Using this information the SM 4 can run an algorithm to move some of the EM-FTEs from the software switch 11 to the hardware switch 10.

When an EM-FTE is selected to be moved to the hardware switch 10, the SM 4 issues a flow_mod containing such FTE to the hardware switch 10. The way in which the flow_mod message is forged should enable to select the installation of such EM-FTE to a CAM-based forwarding table 6 of the hardware OpenFlow switch 10. As will be easily appreciated by those skilled in the art, the way in which a flow_mod has to be forged to achieve such purpose is dependent on the hardware switch implementation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling packets in a network by means of forwarding tables, said method comprising:
   providing a software switching layer for implementing a software forwarding table;
   providing a hardware switching layer for implementing at least one of exact matching forwarding tables and wildcard matching forwarding tables; and
   redistributing, by using a switch management component for controlling the software switching layer and the hardware switching layer, installed forwarding table entries (FTEs), a particular flow between the software switching layer and the hardware switching layer being matched based on traffic characteristics of the flow.

2. The method according to claim 1, wherein the switch management component upon a packet of a flow matching a wildcard FTE of the software forwarding table, analyzes traffic characteristics of the flow, and moves the wildcard FTE to the hardware switching layer based on the traffic characteristics of the flow complying with predefined criteria.

3. The method according to claim 1, wherein the switch management component upon a packet of a flow matching a wildcard FTE of the software forwarding table, analyzes the header fields of the matching packet and, based on the analysis, derives an exact matching FTE.

4. The method according to claim 3, wherein the exact matching FTE is moved to the hardware switching layer and installed in one of the exact matching forwarding tables.

5. The method according to claim 1, wherein the switch management component, monitors a number of packets of a flow received by the software forwarding table that are matching a wildcard FTE.

6. The method according to claim 5, wherein the switch management component generates, for each new packet received by the software forwarding table that matches the wildcard FTE and that has no exact matching FTE already in the software forwarding table, a new exact matching FTE, and wherein the new exact matching FTE is then installed in the software forwarding table.

7. The method according to claim 6, wherein each of the exact matching FTEs identifies a sub-flow of packets, and wherein the switch management component runs a packet counter for each of the sub-flows counting the packets that match respective ones of the exact matching FTEs.

8. The method according to claim 6, wherein the new exact matching FTE is moved to the hardware switching layer and installed in one of the exact matching forwarding tables if a respective packet counter exceeds a predefined contribution threshold.

9. The method according to claim 1, wherein the hardware switching layer is implemented in a hardware OpenFlow switch and the software switching layer is implemented in a software OpenFlow switch connected to the hardware OpenFlow switch.

10. The method according to claim 9, wherein packet tagging and un-tagging operations are applied to one or more of: match packets on the correct input port of the hardware OpenFlow switch, and forward packets to the correct hardware switch destination port in the software OpenFlow switch.

11. A network device implementing forwarding tables for handling packets in a network, the network device comprising:

a software switching layer;

a hardware switching layer; and a switch management component for controlling the software switching layer and the hardware switching layer, the switch management component being configured to redistribute installed forwarding table entries (FTEs) matching a particular flow between the software switching layer and the hardware switching layer based on traffic characteristics of the particular flow.

12. The network device according to claim 11, wherein the software switching layer implements at least one software forwarding table that enables installation of wildcard matching FTEs, wherein the hardware switching layer implements at least one of exact matching forwarding tables and wildcard matching forwarding tables, and wherein the forwarding tables are configured to successively process a packet received at an input port of the network device first by the exact matching forwarding tables, second by the wildcard matching forwarding tables, and third by the software forwarding table.

13. The network device according to claim 11, wherein the switch management component is configured to analyze the header fields of a packet of a flow that matches a wildcard FTE of the software forwarding table and to derive an exact matching FTE based on the analysis.

14. The network device according to claim 11, comprising a hardware OpenFlow switch that implements the hardware switching layer and a software OpenFlow switch connected thereto that implements the software switching layer.

15. The network device according to claim 14, wherein the switch management component is implemented as a proxy element that is configured to exchange OpenFlow messages both with the hardware and the software OpenFlow switches and with an OpenFlow Controller.

* * * * *